(12) United States Patent
Skarie et al.

(10) Patent No.: US 6,371,532 B1
(45) Date of Patent: Apr. 16, 2002

(54) TRACTION-ENHANCING SYSTEM FOR USE WITH MOTOR VEHICLES

(75) Inventors: James B. Skarie, 3504 Larchwood Dr., Minnetonka, MN (US) 55345; Christopher J. Skarie, Audubon, MN (US); Loren P. Skarie, Vergas, MN (US); Paul R. Skarie, Minnetonka, MN (US)

(73) Assignee: James B. Skarie, Minnetonka, MN (US)

( * ) Notice: Subject to any disclaimer, the term of this patent is extended or adjusted under 35 U.S.C. 154(b) by 0 days.

(21) Appl. No.: 09/235,930

(22) Filed: Jan. 22, 1999

(51) Int. Cl.[7] .............................................. B60B 39/00
(52) U.S. Cl. ............................................ 291/38; 291/2
(58) Field of Search ................................. 291/2, 25, 30, 291/38, 41, 46

(56) References Cited

U.S. PATENT DOCUMENTS

| 2,110,247 A | 3/1938 | Swan | 291/46 |
| 2,498,164 A | 2/1950 | Hunziker | 291/3 |

(List continued on next page.)

FOREIGN PATENT DOCUMENTS

| BE | 525256 | 1/1954 | |
| DE | 8716464 | 2/1988 | B06B/39/04 |
| DE | 4004038 | 8/1991 | B60T/8/00 |
| DE | 29716940 | 1/1998 | B60B/39/00 |
| EP | 0809117 | 11/1997 | G01S/5/14 |
| JP | 06-185493 | 7/1994 | B60B/39/10 |
| JP | 06-328901 A | 11/1994 | B60B/39/06 |
| JP | 09/193604 | 7/1997 | B60B/39/08 |
| JP | 09-188103 | 11/1997 | B60B/39/08 |
| WO | 98/13239 | 9/1996 | B60T/8/00 |

OTHER PUBLICATIONS

Hayhoe, G.F., "Application of Hot Sand for Winter Ice Control", State of Alska Department of Transportation and Public Facilities, Fairbanks, Alaska, Laboratory Phase Final Report, 1–33, (May 1984).

*Primary Examiner*—S. Joseph Morano
*Assistant Examiner*—Robert J. McCarry, Jr.
(74) *Attorney, Agent, or Firm*—Schwegman, Lundberg, Woessner & Kluth, P.A.

(57) ABSTRACT

A vehicle-mounted device and method for delivering a traction enhancing material to a road surface directly in front of one or more tires is disclosed. The device delivers the traction enhancing material when an electronic controller detects a loss of traction. The device uses an air duct to collect air incident on the vehicle and direct the air to the road surface. The device further comprises a hopper to hold the traction enhancing material. The hopper is coupled to the air duct at an aperture. When activated, a valve assembly selectively opens and closes the aperture in response to controller commands. When opened, the traction enhancing material accelerates from the hopper into the duct and becomes entrained in the air stream where it is then delivered to the road surface. Once delivered, the traction enhancing material is introduced between the tires and the road surface to effectively increase the coefficient of friction therebetween.

19 Claims, 10 Drawing Sheets

U.S. PATENT DOCUMENTS

| | | | |
|---|---|---|---|
| 3,093,399 A | 6/1963 | Smith | 291/2 |
| 3,140,110 A | 7/1964 | Wonner | 291/2 |
| 3,156,492 A | 11/1964 | Murray | 291/42 |
| 3,198,137 A | 8/1965 | White, Jr. | 105/26 |
| 3,201,159 A | 8/1965 | Williams | 291/3 |
| 3,271,060 A | 9/1965 | Kilgore | 291/3 |
| 3,256,920 A | 6/1966 | Byers | 152/208 |
| 3,289,668 A | 12/1966 | Drucker | 126/271.1 |
| 3,298,727 A | 1/1967 | Picard | 291/3 |
| 3,345,097 A | 10/1967 | Smith | 291/3 |
| 3,345,098 A | 10/1967 | Kilgore | 291/3 |
| 3,399,917 A | 9/1968 | McLean | 291/3 |
| 3,415,537 A | 12/1968 | Goggins | 280/150 |
| 3,466,097 A | 9/1969 | Flook, Jr. | 303/21 |
| 3,680,885 A | 8/1972 | DeCardi et al. | 280/150 |
| 3,779,324 A | 12/1973 | Kreske, Jr. | 180/1 R |
| 3,797,867 A | 3/1974 | Hartl | 291/3 |
| 3,827,736 A | 8/1974 | Mango | 291/20 |
| 3,870,352 A | 3/1975 | Engler et al. | 291/15 |
| 3,889,991 A | 6/1975 | Hewitt | 291/1 |
| 3,915,484 A | 10/1975 | Lee | 291/3 |
| 3,938,835 A | 2/1976 | Lee | 291/34 |
| 4,043,577 A | 8/1977 | Nettles | 291/25 |
| 4,063,606 A | 12/1977 | Makinson | 180/1 R |
| 4,099,688 A | 7/1978 | Jayne | 244/103 R |
| 4,203,423 A | 5/1980 | Ricci | 126/271.1 |
| 4,260,199 A | 4/1981 | Reinecke | 303/96 |
| 4,316,625 A | 2/1982 | Goon et al. | 291/1 |
| 4,486,039 A | 12/1984 | Jayne | 291/3 |
| 4,575,010 A | 3/1986 | Zimmerman | 239/650 |
| 4,575,135 A | 3/1986 | Cervinka | 291/20 |
| 4,747,627 A | 5/1988 | Shigeura et al. | 291/3 |
| 4,750,680 A | 6/1988 | Shigeura et al. | 291/47 |
| 4,789,190 A | 12/1988 | Eike et al. | 291/6 |
| 4,848,510 A | 7/1989 | Ahmed | 180/309 |
| 4,852,949 A | 8/1989 | Quinn et al. | 303/100 |
| 4,968,069 A | 11/1990 | Jensen | 291/3 |
| 5,010,982 A | 4/1991 | Sedlmayr | 188/4 B |
| 5,100,175 A | 3/1992 | Swallow et al. | 280/757 |
| 5,118,142 A | 6/1992 | Bish | 291/46 |
| 5,350,035 A | 9/1994 | Bodier et al. | 180/271 |
| 5,542,719 A | 8/1996 | Nordin | 291/3 |
| 5,580,106 A | 12/1996 | Dulberg et al. | 291/3 |
| 5,582,441 A | 12/1996 | Frost | 291/2 |

TRACTION-ENHANCING SYSTEM FOR USE WITH MOTOR VEHICLES

TECHNICAL FIELD

The present invention relates to a device for delivering sand to a road surface and, more particularly, to a vehicle-mounted device that automatically delivers a traction enhancing material proximate one or more wheels of a vehicle.

BACKGROUND OF THE INVENTION

In almost all climates, slippery roads pose a potential burden to drivers. In colder climates, ice formation on the roads can create treacherous driving conditions. In warmer weather where icy roads are not an issue, wet roads have a similar albeit reduced adverse effect on tire traction.

Loss of traction due to wet or icy roads is attributable to a change in the coefficient of friction (COF) between the tire and the road surface. On dry roads, the COF is adequate to permit traction for accelerating, decelerating, and turning. However, when the pavement is wet or icy, the COF drops and the vehicle's performance characteristics become more unpredictable. In particular, the vehicle is more susceptible to tire spin during acceleration and tire lock during braking and turning. Although tire slippage during acceleration is a problem, it does not pose the danger inherent with decreased stopping ability. While the present invention is advantageous during both tire slip (during acceleration) and tire skid (during deceleration) situations, it is directed primarily to a traction enhancing device and method for assisting a vehicle in decelerating and stopping.

Various devices have been developed to improve vehicle traction on ice or other slippery road surfaces. The most common method known is to dispense granular salt or sand directly to the road surface. While effective in providing traction, salt is highly corrosive to vehicles and cumulative use can damage road surfaces. Sand, on the other hand, provides the traction benefits of salt without the harmful side effects.

Sand is typically dispensed by a municipal dump truck, usually following a winter storm. Unfortunately, there is a period of time after the storm in which the roads remain untreated. This is particularly evident on smaller roads and side streets which may not be treated for quite some time. In addition to this delay, sand coverage of a road surface may be spotty due to the operation of conventional sand spreaders. For these reasons, municipal sand dispensing systems are not completely effective.

In an attempt to overcome these problems, sand dispensing systems that attach directly to an automobile have been developed. These systems are advantageous over municipal spreaders in that they are integral to the vehicle. Thus, they can dispense sand at any time and in any place. For example, U.S. Pat. No. 5,118,142 discloses a traction device that disperses sand to the vicinity of one or more tires of an automobile. While effective in delivering sand to the tire/road interface, the '142 patent requires manual activation and requires a steady stream of delivered sand. Depending on the speed of the car, a large volume of sand may be needed in order to bring the car to a complete stop.

U.S. Pat. No. 5,582,441 discloses another system comprising a sand reservoir incorporated into the front bumper of an automobile. A blower system dispenses the sand in a wide pattern forward of the vehicle. While requiring less sand than other sand dispensing devices, the '441 system still delivers more sand than is necessary. Stated alternatively, the wide sand dispersion pattern results in excessive sand deposited on the road, some of which is not utilized by the vehicle tires. Additionally, the '441 patent requires a blower source in order to propel the sand.

Accordingly, the current traction enhancing devices have disadvantages that limit their commercial acceptance. A traction enhancing device that is fully automatic and applies only the amount of traction enhancing material necessary to adequately increase the COF is highly desirable.

SUMMARY OF INVENTION

A traction enhancing device and method are disclosed. The traction enhancing device, in one embodiment, comprises an air duct for receiving air incident on the vehicle; a storage hopper adapted to hold a traction enhancing material; a valve assembly intermediate the hopper and the air duct wherein the valve assembly selectively permits communication between the hopper and the air duct; and a control system for selectively activating the valve assembly in response to one or more control inputs.

A method of dispensing a traction enhancing material to a road surface generally forward of one or more tires of a moving vehicle wherein the vehicle has an anti-lock brake system is also disclosed. In one embodiment, the method includes collecting air incident on the moving vehicle; accelerating the air through an air duct; sensing a loss of traction between the one or more tires and the road surface beyond a predefined threshold level; selectively dispensing a traction enhancing material into the air duct; and directing the accelerated air and entrained traction enhancing material to the road surface forward of the one or more tires.

In one embodiment, the air duct has an air scoop for receiving air and a nozzle for directing the received air to a tire/road interface. The scoop may also include an elbow intermediate the air scoop and the nozzle.

The hopper may couple to the air duct at an aperture. Furthermore, the aperture may be selectively covered by a valve assembly having a movable valve member.

In another embodiment, a device for distributing a traction enhancing material to a portion of road surface generally forward of one or more tires of a moving vehicle is disclosed. The device includes an air duct defining an interior passageway, wherein the air duct has: a scoop for receiving air incident on the moving vehicle; a nozzle for directing the air to the road surface; and one or more elbows intermediate the scoop and nozzle. The elbow may provide a smooth transition for air traveling from the scoop to the nozzle. The device may also include a storage hopper adapted to store a volume of traction enhancing material wherein the hopper has an outlet channel. Additionally, the apparatus includes a valve assembly for selectively opening and closing an aperture defined by an intersection of the outlet channel and the air duct. The valve assembly permits movement of the traction enhancing material from the hopper to the air duct where it becomes entrained with the air. Furthermore, the apparatus includes a control system for selectively activating the valve assembly in response to one or more control inputs.

In yet another embodiment, the scoop has a flared mouth and is located slightly forward of the front end of the vehicle. The interior passageway may have a reduced diameter and the nozzle may include an enlarged, annular portion and an internal tubular portion. The internal tubular portion may have one or more openings that permit the air to expand from the tubular portion into the annular portion but prevent the passage of the traction enhancing material from the tubular portion into the annular portion. In one embodiment, the openings are holes. In another embodiment, the openings are slots.

The hopper may have a removable cover and a level sensor. Proximate the channel and aperture, the hopper may also include a heat trace to prevent freezing of the traction enhancing material.

The control system may include a microprocessor-based module for receiving and processing the control inputs. It may also have a first control output for selectively opening and closing the valve assembly in response to the control inputs and a second control output for selectively aiming the nozzle. The controller may monitor various control inputs including one or more accelerometers operatively connected to the control system; one or more wheel speed sensors operatively connected to the control system and one or more steering wheel position sensors operatively connected to the control system.

In yet another embodiment, an apparatus for distributing a traction enhancing material to a portion of road surface generally forward of one or more tires of a moving vehicle is described. The apparatus comprises a source of compressed gas; and a discharge unit, wherein the discharge unit can selectively discharge a projectile to the road surface and wherein the discharge unit develops energy from the source of compressed gas.

In still yet another embodiment, the method may include intermittently rotating the tire in response to the anti-lock brake system, thereby trapping a traction enhancing material between a tire and a road surface and thus increasing traction.

In another embodiment, a method of dispensing a traction enhancing material to a portion of road surface generally forward of one or more tires of a vehicle having an anti-lock brake system is disclosed wherein the method comprises determining a wheel speed; determining a ground speed; comparing the wheel speed to the ground speed; opening a valve in proportional response to the ground speed; dispensing a traction enhancing material through the valve; determining when the ground speed matches the wheel speed; and closing the valve.

Accordingly, the present invention provides an effective traction device that can be used on a variety of vehicles. By taking advantage of the vehicle anti-lock brake system, the present invention may provide improved traction with minimal dispersion of sand. Additionally, the present invention takes advantage of air incident on the vehicle rather than a separate power source to disperse the traction enhancing material. Furthermore, the system is fully automatic and requires no driver input in order to operate.

BRIEF DESCRIPTION OF THE DRAWINGS

The invention described herein will be further characterized with reference to the drawings, wherein.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
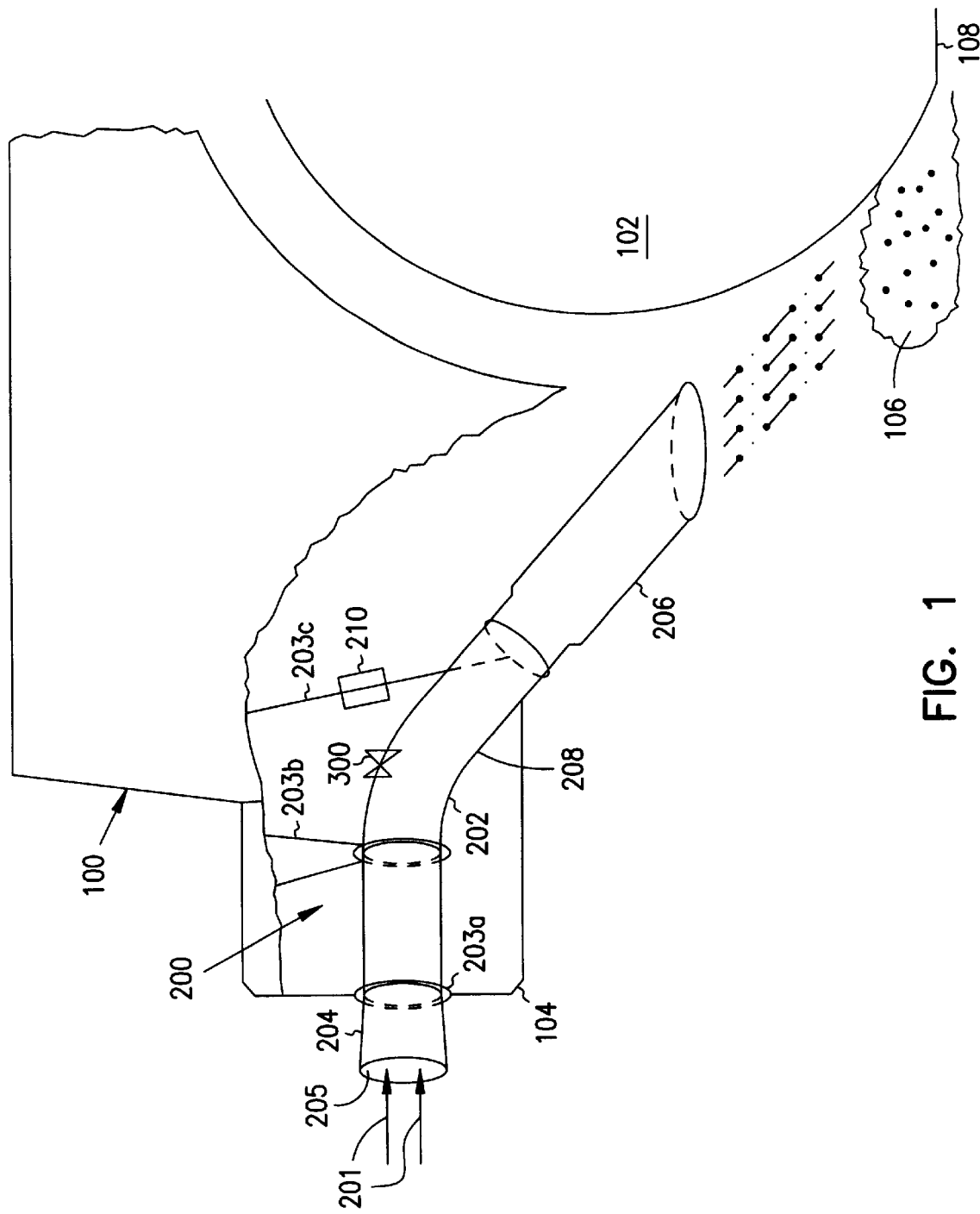
FIG. 1 is a diagrammatic side elevational view of a traction enhancing device in accordance with one embodiment of the present invention as it would be installed on an automobile.

Referring to FIG. 1, a first embodiment of a traction device 200 is shown as it may appear when mounted to the front of a vehicle 100. For simplicity, the invention is described herein with reference to a pair of front wheels 102 of a conventional automobile. However, those skilled in the art will realize that the traction device of the present invention could also be used in conjunction with the rear wheels. Likewise, the present invention could be adapted to other multi-wheeled vehicles including but not limited to pick-up trucks, semi-tractors, and utility vehicles. With slight modifications, the device 200 could also be used with aircraft and railroad vehicles.

Still referring to FIG. 1, the device 200 comprises an air duct or conduit 202 attached within a wheel well of the vehicle. A series of support member 203a, 203b, and 203c support the air duct in place. The air duct 202 further comprises an air scoop 204, and an air nozzle 206. In one embodiment, the air scoop 204 extends slightly forward of a vehicle bumper 104. The purpose of the air scoop 204 is to collect a stream of incident air 201 as the vehicle travels in a forward direction.

The air duct 202 further includes an elbow 208. The elbow 208 joins the scoop 204 and the nozzle 206. It provides a smooth transition from the generally fore-and-aft direction of the scoop to the more downward and outward direction of the nozzle.

Figures 2, 3:
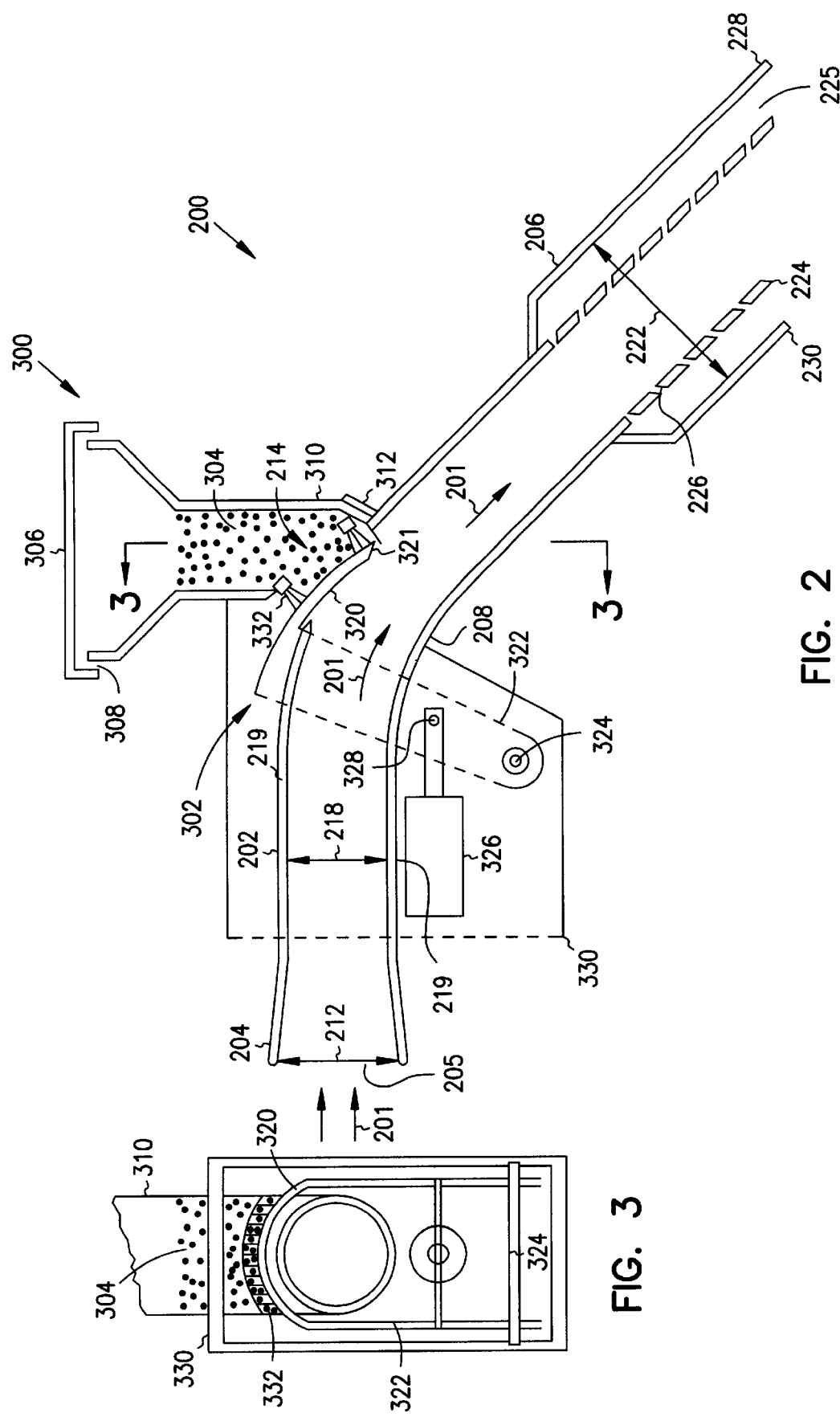
FIG. 2 is detailed side elevational view of a traction enhancing device in accordance with another embodiment of the present invention as it would be installed on an automobile.
FIG. 3 is an enlarged front sectional view of the traction device of FIG. 2 taken along lines 3—3 of FIG. 2.

Referring now to FIG. 2, a more detailed, cross-sectional view of the device 200 is shown. A hopper 300 is operatively coupled to the air duct 202 at an aperture 214. A valve assembly 302 is located at the aperture 214. The hopper 300 holds a volume of traction enhancing material 304. To simplify the discussion, the traction enhancing material 304 will be hereinafter described as sand. However, other granular materials, including but not limited to, #1 grit or crushed granular glass are equally within the scope of the invention. As described in detail below, when the traction device 200 is activated, sand is released into the duct 202 by the valve assembly 302 and becomes entrained or intermixed with the air 201. The entrained sand 304 travels through the nozzle 206 and is dispersed forward in an area 106 forward of a tire/road interface 108 (see FIG. 1).

A remotely located control system or controller 400 (shown diagrammatically in FIG. 11) constantly monitors various vehicle operating parameters which are further described below. When the controller 400 senses that the tire 102 has lost traction, the controller can activate the valve assembly 302 to initiate sand delivery.

Due to the cyclic braking characteristics of the vehicle's anti-lock brake system, sand 304 delivered to the road can migrate beneath the tire 102 to the tire/road interface 108 as the tire 102 incrementally rotates. That is, as the anti-lock brake system cycles the brakes, the tire 102 rotates. As it rotates, the tire 102 engages the sand dispensed by the nozzle 206 and draws it between the tire 102 and the road surface. With the sand trapped between the tire and the slippery road, the COF increases substantially. Thus, the vehicle is better able to stop. Several parameters are simultaneously monitored to determine how much sand is delivered and for how long. When the controller 400 determines that the vehicle has regained traction, it commands the valve assembly 302 closed, discontinuing sand delivery.

With this description, attention will now be focused on various components of one exemplary embodiment of the traction device 200.

The Air Duct

Referring to FIGS. 1 and 2, the air duct 202 is shown in varying degrees of detail. Referring to FIG. 1, a partial section view of the vehicle 100 depicts the air duct 202 of the present invention as it might appear when mounted to the vehicle forward of the tire 102. Typically, although not exclusively, the traction enhancing device 200 is mounted forward of each front wheel 102 of the vehicle 100. While this configuration does not provide sand directly to the rear wheels, sand dispersed ahead of the front wheels will also assist the rear wheels as the vehicle travels forward. However, where necessary, the device 200 may also be placed at the rear wheels with minimal modifications. The air duct 202 provides a mechanism for passively receiving a stream of air 201 and delivering that stream of air with the traction enhancing material 304 entrained therein to the road surface directly in front of the tire 102.

Referring specifically to FIG. 1, the air scoop 204 is formed on the forward end of the air duct 202. The air scoop 204 has an opening or mouth 205 which, in one embodiment, is located slightly forward of the leading surface of the vehicle bumper 104. The mouth 205 is placed forward of the bumper to improve the dynamic airflow characteristics into the scoop 204. Ideally, the mouth 205 is placed to provide smooth and continuous airflow into the scoop 204. If the mouth 205 is placed flush to the vehicle bumper 104, a turbulent air flow pattern caused by the surrounding vehicle surfaces may be introduced. This may produce an inferior quality air stream 201 into the mouth 205. Due to the variety of vehicle configurations currently available, the optimum location of the mouth 205 relative to the vehicle 100 will vary with each vehicle model.

Referring now to FIG. 2, the mouth 205 may be flared such that it has a mouth diameter 212 which tapers to a duct diameter 218. For reasons discussed in detail below, the narrowing of the duct 202 in this manner may further optimize air flow through the duct.

The air duct 202 is supported by a series of supports 203 connected to a chassis of the vehicle as best shown in FIG. 1. In the first embodiment, three supports are used: a forward (or bumper) bracket 203a, an intermediate bracket 203b near the elbow, and rear bracket 203c near the nozzle. All brackets 203 attach to the vehicle frame. While three brackets are shown herein, those skilled in the art will realize that other mounting configurations and methods could be used and still fall within the scope of the invention.

Still referring to FIG. 1, at the opposite end of the scoop 204 is the nozzle 206. In one embodiment, the nozzle 206 may be a flexible plastic or rubber material. Such construction permits the nozzle 206 to be placed close to the ground without severe damage from occasional contact with ground obstructions (e.g., off road hazards, curbs, etc.). Where the nozzle can be mounted clear of road obstacles, the material used may be a more rigid material including plastic or PVC (polyvinyl chloride) tubing.

Ideally, the nozzle can be optimally located proximal to the wheel. However, Applicant perceives that certain vehicle configurations (e.g., vehicles having larger wheels like trucks and semis) may necessitate mounting the nozzle farther from the ground. In this case, air and entrained sand dispersed from the nozzle is more heavily influenced by external factors such as cross-winds. In this case, various techniques may be used to improve sand delivery. One technique is the inclusion of a nozzle aiming mechanism 210 as shown diagrammatically in FIG. 1. The aiming mechanism may be a servo that makes the necessary adjustments to the flexible nozzle assembly 206 based on commands from the controller 400. The controller 400 may manipulate the aiming mechanism 210 based on various inputs including the speed of the vehicle. Those of skill in the art will realize that other inputs (e.g., crosswind sensors) could also be used to control the aiming mechanism. As an alternative to the nozzle aiming mechanism 210, the nozzle 206 may include an extension (not shown) that extends and retracts from the nozzle 206 to better direct the sand to the area 106. Accordingly, various modifications are possible to accommodate less than optimal nozzle placement. However, many vehicles will permit adequate nozzle placement and thus may not require aiming mechanisms and extension devices.

Figure 4:
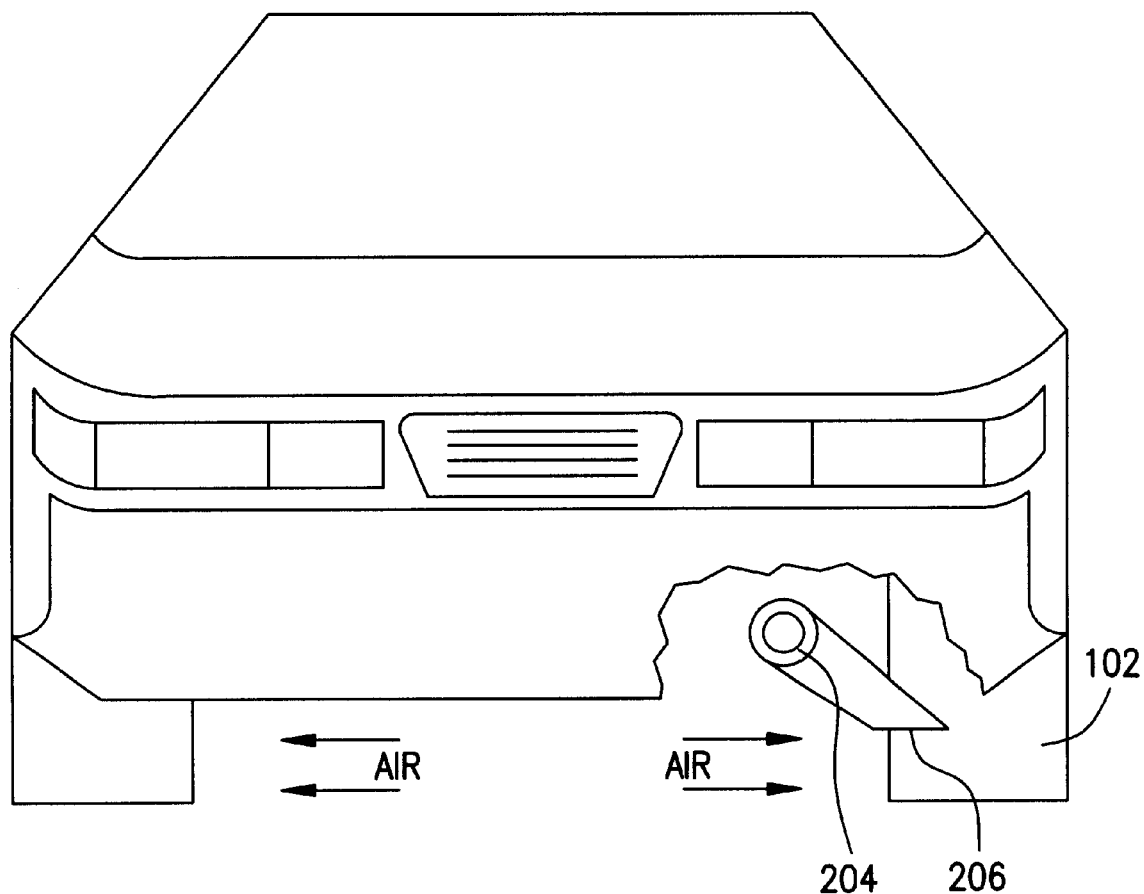
FIG. 4 is a diagrammatic front elevational view of the traction enhancing device of FIG. 2.

Another issue concerning nozzle placement involves the air flow patterns around the front underside of the vehicle 100. Specifically, as the vehicle travels, air incident on the front of the vehicle is directed outwardly from the vehicle centerline. This flow produces an outward air flow pattern in the vicinity of the front tire 102. Sand 304 dispersed from the nozzle may be influenced by this air stream and thus directed to an area beyond (i.e., outward of) the tire 102. To counteract this effect, the air duct 202 may be angled such that the air scoop 204 is located inboard (i.e., closer to the vehicle centerline) of the nozzle 206 such that the nozzle 206 is aimed downwardly and outwardly from a position slightly inboard of the tire as shown in FIG. 4. Thus, the nozzle 206 is better positioned to take advantage of this external outward flow pattern.

To optimize the air flow through the duct 202, a venturi may be formed therein. A venturi is typically constructed by providing an intermediate section in the conduit having a cross section smaller than either the entrance or the exit. In the embodiment represented in FIG. 2, the duct narrows from the flared diameter 212 to the reduced diameter 218. The duct expands again at the nozzle 206 to a nozzle diameter 222. Interior to the nozzle 206 is an internal baffle tube 224 whereby an annular portion 225 is defined therebetween. The baffle tube 224 includes a series of openings which, in one embodiment, comprise orifices 226 that are smaller than the grain size of the sand 304. The purpose of the baffle tube is to let air within the duct expand outwardly into the annular portion 225 while the sand 304 is retained within the baffle tube 224. This configuration permits the air stream 201 to expand while restricting the sand dispersion pattern. Thus, scattering of the sand 304 is minimized. In the first embodiment, the orifices 226 are drilled at an angle (as shown in FIG. 2) to better prevent the exit of sand 304 therethrough. While the venturi configuration herein described may improve performance, it is not critical to the operation of the traction enhancing device. That is, the device 200 could operate with a constant duct diameter.

Still referring to FIG. 2, a neck 219 joins the scoop 204 to the elbow 208. While shown in the first embodiment as a single tube, the neck 219 can also be subdivided into separate air passageways or "flutes" (not shown) to assist in the reduction of turbulent flow within the air duct 202.

In one embodiment, the nozzle 206 is elliptical in cross section wherein it has a larger fore-and-aft opening (the major axis of the ellipse) than side-to-side opening (the minor axis of the ellipse). As clearly shown in FIG. 2, the nozzle 206 may also terminate parallel to the ground plane to form an exit having a trailing edge 228 and a leading edge 230. This geometry provides focused sand delivery and reduces sand scatter lateral to the tire.

Figure 6:
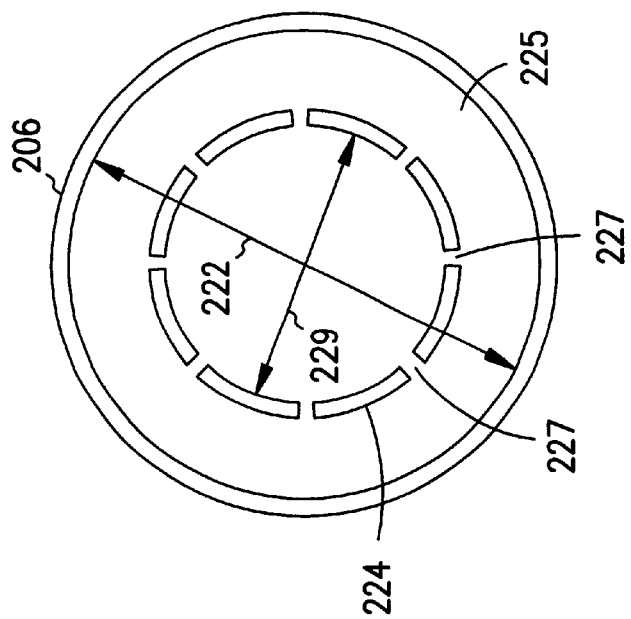
FIG. 6 is an end view of the nozzle portion of FIG. 5.
Figure 5:
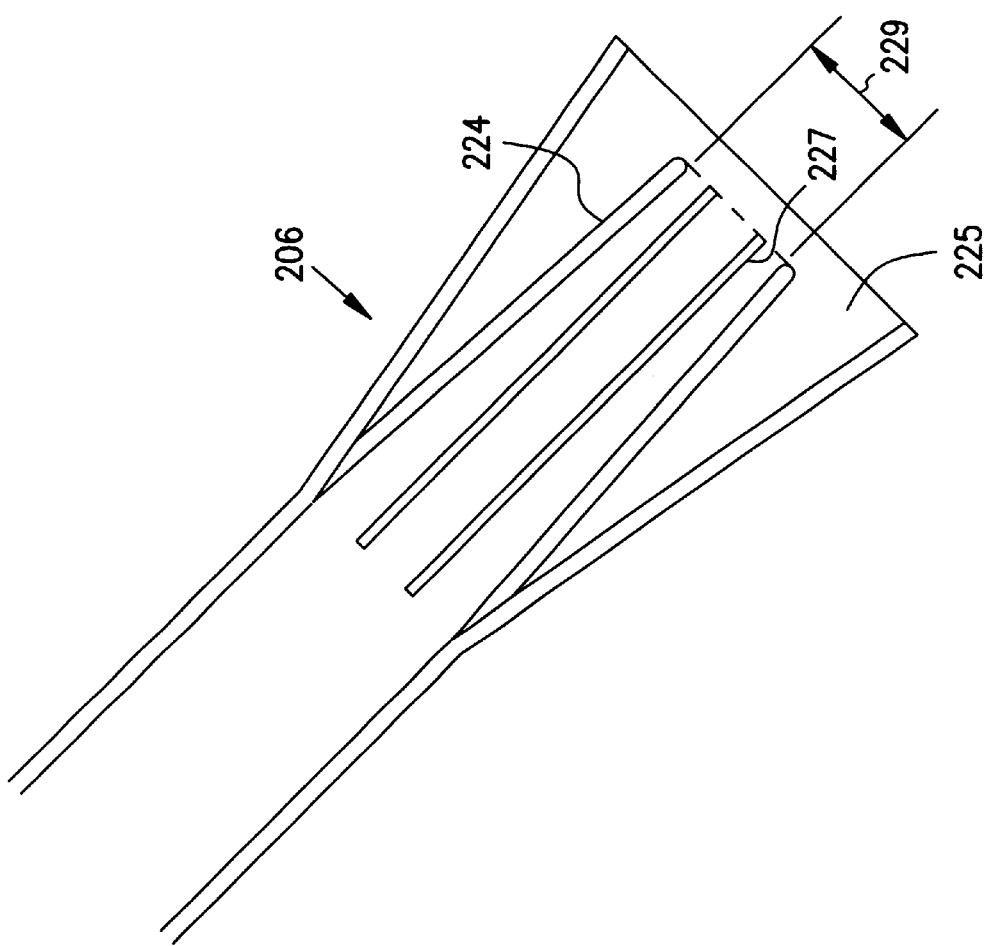
FIG. 5 is a cross sectional side view illustrating an alternative embodiment of the nozzle portion of the traction enhancing device of FIG. 2.

FIGS. 5 and 6 illustrate another embodiment of the nozzle 206. In this embodiment, the nozzle tube expands linearly to the nozzle diameter 222 while the baffle tube 224 converges to a smaller diameter 229. The narrowing baffle tube directs the traction enhancing material to the predetermined location. The baffle tube again includes orifices to permit the expansion of air into the annular area 225. However, this particular embodiment utilizes a series of slots 227 cut longitudinally in the baffle tube 224 instead of the holes 226. The slot size can be optimized to control the volume of air expanding from the baffle tube 224. Like the orifices 226, the slots 227 are sized to permit passage of air but prevent the passage of sand 304 therethrough. The slots 227 may be "V"-shaped as shown in FIG. 6 wherein the slot is wider on the baffle tube outer diameter than on the inner diameter. Alternatively, the slot walls may be parallel.

The nozzle 206 may form a separate "boot" that secures to the air duct 202 or it may be formed integrally with the duct. It may be made of a flexible or-semi-flexible material so that it is better able to withstand contact with road obstacles.

Now referring to FIGS. 1 and 2, the elbow 208 will be described. The primary purpose of the elbow is to provide a smooth transition from the air scoop 204 to the nozzle 206. That is, it diverts the air stream 201 from its predominantly fore-and-aft direction to the downward and outward direction of the nozzle 206. While only one elbow is shown, multiple elbows may receive air from one scoop 204. The angle and radius of the elbow 208 are dependent on the particular vehicle.

From the foregoing discussion, the optimal air duct 202 is highly vehicle dependent. Accordingly, the embodiments described herein are considered to be illustrative only.

Hopper

Figure 12:
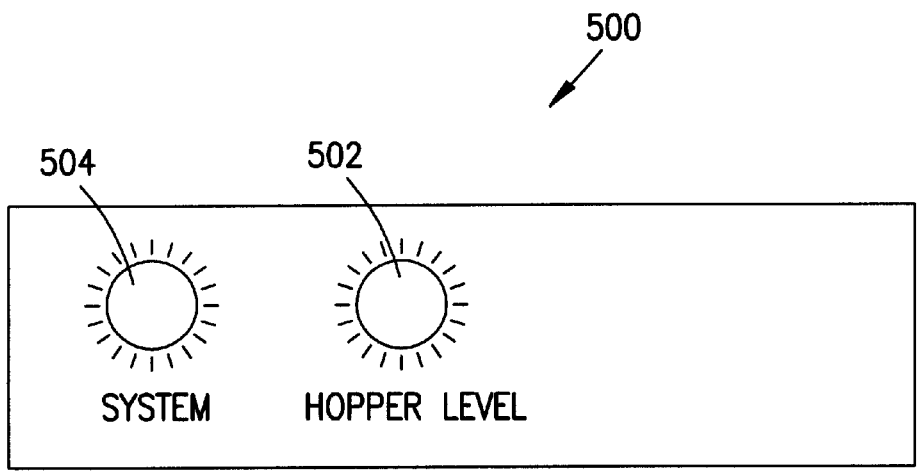
FIG. 12 is a dashboard indicator panel in accordance with one embodiment of the invention.

Referring once again to FIG. 2, the hopper assembly 300 may be located generally above the air duct 202. Alternatively, the hopper 300 may be remotely mounted. The purpose of the hopper 300 is to hold a sufficient quantity of material 304 to permit adequate operation of the traction device 200. The hopper 300 includes a removable hopper cover 306. The cover 306 permits selective filling of the hopper while excluding foreign matter when the cover is installed. It may include ventilation passages 308 to allow for the escape of any moisture trapped within hopper 300. The hopper 300 may also include a screen (not shown) located at the top of the hopper to exclude granular material too large for optimum operation. A level sensor (not shown) may transmit volumetric information to a dashboard panel 500 having an indicator 502 as shown in FIG. 12.

The lower portion of the hopper forms an outlet channel 310 connected to the air duct 202 at the aperture 214. The aperture 214 is located above the elbow 208. The aperture 214 will be discussed in more detail below. A heat trace 312 may encompass a bottom portion of the hopper 300 and the channel 310 to prevent freezing within the channel. The heat trace 312 may extend around portions of the air duct 202 as well. In the first embodiment, the heat trace 312 is a simple electrically resistive device.

Valve Assembly

The valve assembly 302 is shown in FIGS. 2, 3, 7, 8, and 9. The primary function of the valve assembly is to selectively open and close the aperture 214 in response to inputs from the controller 400.

A valve plate 320 is shown in a closed position in FIG. 2. In addition to the closed position shown, the valve plate 320 can assume a fully open position or any intermediate, partially opened position. In the closed position, the valve plate 320 interrupts the flow of sand 304. In the open position, the sand 304 accelerates by gravity through the aperture 214 into the air duct 202 where it becomes entrained in the air stream 201. The amount of sand 304 that is released into the air stream 201 can be limited by positioning the valve plate 320 at an intermediate, partially open position.

For optimum operation of the device 200, the valve plate 320 must be able to move freely. Accordingly, binding and interference due to adjacent structure, sand, water, or contaminants must be minimized. The first embodiment includes various features to minimize binding and prevent contaminants from interfering with the movement of the valve plate. However, other features may also be incorporated and still fall within the scope of the invention. Thus, the following description of the valve plate 320 and its related components is considered to be illustrative only.

From FIG. 3, the surface of the valve plate 320 that contacts the sand 304 is generally arc-shaped as viewed from the front. This shape places the sand in close proximity to the air stream within the duct 202. Referring now to FIGS. 2 and 7, the plate 320 also forms a radius (when viewed from the side) that is substantially congruent to the radius of the elbow 208 (see FIG. 2). This permits the valve plate to move freely between its opened and closed positions without interference from the elbow 208. The particular curved construction of the plate 320 furthermore places the sand 304 near to the duct 202, thus minimizing any time delay in introducing the sand 304 into the air stream 201. To further improve time response, the valve plate 320 is constructed of a relatively thin material and is positioned on the inside of the duct 202 as near to the air stream 201 as possible.

Referring now to FIG. 8, the valve plate 320 tapers from a wide forward edge 320a to a narrow trailing edge 320b, forming a wedge shape when viewed from above. From FIG. 7, the trailing edge of the valve plate 320 defines a sharp edge 321. These features, as explained below, also minimize friction and drag on the valve plate 320 as it opens and closes.

Referring once again to FIGS. 2 and 3, the valve plate 320 further comprises a pair of arms 322 connected to a pivot axle 324. The axle 324 is located generally below and transverse to the air duct 202. However, other axle locations can be used without departing from the scope of the invention. The pivot axle 324 defines the pivot axis for the valve plate 320 and defines the center of the arc forming the top of the valve plate 320. Accordingly, the axle 324 is positioned to permit unobstructed movement of the valve plate 320 between its fully closed and fully opened positions. Conventional bushings or bearings may be used with the pivot axle 324 to permit smooth operation.

A solenoid 326, best viewed in FIG. 2, is pivotally connected to the arms 322 at a pivot joint 328. The opposite end of the solenoid 326 is connected to a fixed support (not shown). As the solenoid extends and retracts, it pivots the arms 322, and thus the valve plate 320 between the closed and opened positions respectively. The solenoid 326 is biased to its extended position by an internal spring such that the valve plate 320 is normally closed. The movement of the solenoid 326 relative to the valve plate position is not critical and thus other configurations (e.g., solenoid extends to open) can be utilized and still fall within the scope of the invention. Additionally, other actuating devices (e.g., servos, pneumatic cylinders, stepper motors, rack & pinion mechanisms, etc.) are also contemplated. An enclosure 330 surrounds the axle 324, solenoid 326 and related components. The enclosure may form a watertight seal around the solenoid, axle, and a portion of the duct to exclude moisture and foreign matter from contacting the valve assembly 302. In the first embodiment, the enclosure 330 may support the axle 324.

Figure 7:
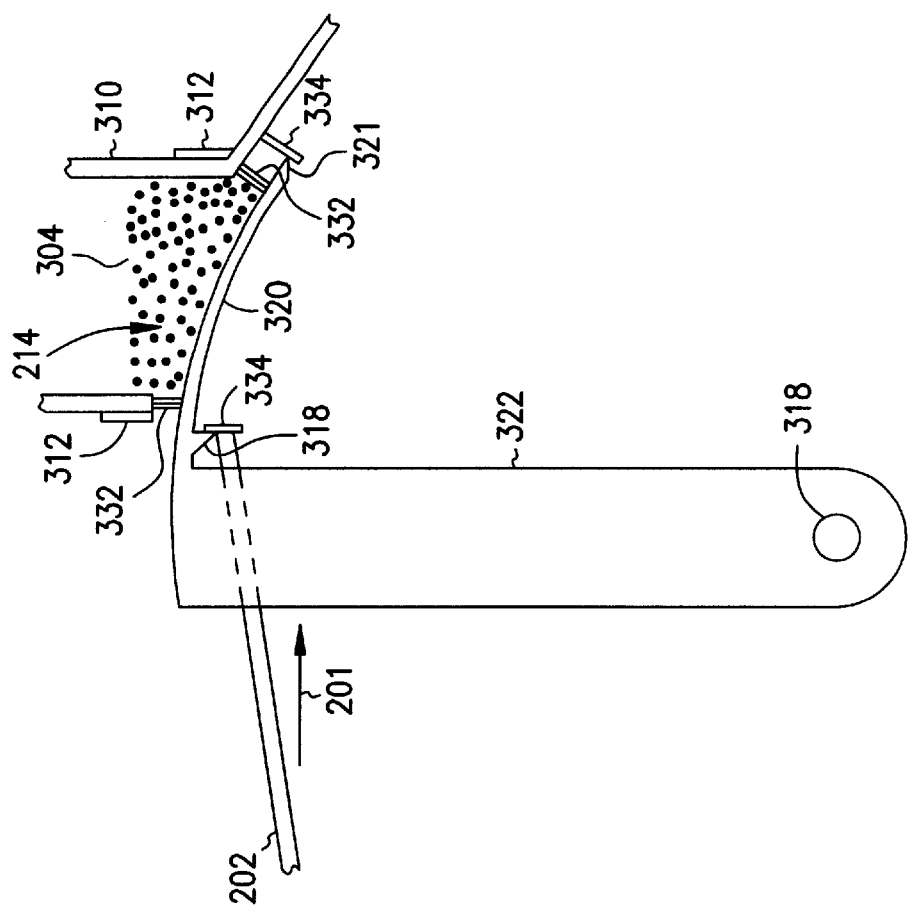
FIG. 7 is an enlarged partial side view of the valve plate and aperture of FIG. 2.
Figure 8:
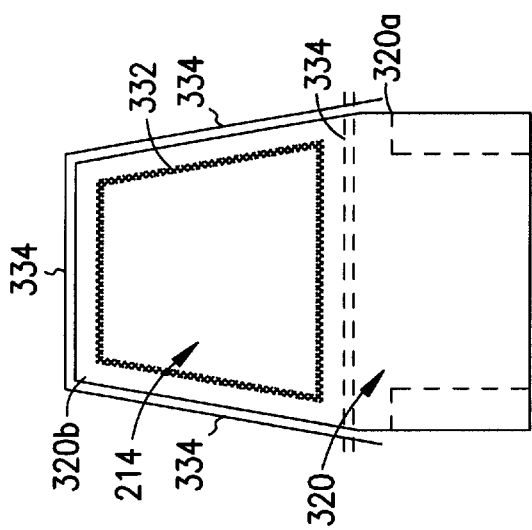
FIG. 8 is a partial top plan view of the aperture of FIG. 2 showing the gasket geometry.
Figure 9:
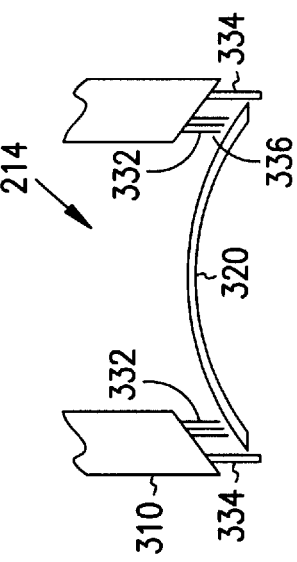
FIG. 9 is a enlarged, partial front elevational view of the valve plate of FIG. 2.

Referring now to FIGS. 7–9, a bristled brush 332 extends around the entire periphery of the aperture 214. The brush 332 acts as a sand retaining member or barrier to prevent sand from flowing from the hopper when the valve plate is closed. In the first embodiment, the brush does not actually contact the plate 320 but is positioned such that a slight clearance gap 336 exists (see FIG. 9). In one embodiment, the gap 336 is approximately 1/32"–1/16". While some sand can escape, the gap is minimal so that sand becomes trapped and fills the gap. Thus, the brush 332 contains the sand when the valve plate 320 is closed. In one embodiment, the brush 332 may be mounted to an interior portion of the channel 310 of the hopper 300.

While the brush 332 keeps the sand contained, it does not seal the aperture 214 from the effects of weather. Since the sand 304 in the hopper 300 must be kept dry in order to properly disperse, a water-tight gasket 334 as shown in FIGS. 7–9 extends peripherally around the aperture 214 outside of the brush 332. The gasket may be a single or multi-piece assembly but should provide a relatively water-tight seal. The gasket 334 prevents moisture from entering the hopper 300 either from the wheel well or from the duct mouth 205. In the first embodiment, the gasket 334 seals along the sides and back edge of the valve plate and then extends beneath the front of the plate as shown in FIG. 7 to seal against a seal lip 318 integral to the plate 320.

Having described the components of the valve assembly 302, its operation will now be discussed. Referring to FIG. 7, the valve plate 320 is shown in its normally closed position. In this position, the trailing edge 321 and the seal lip 318 are sealed against the rear and front portions of the gasket 334 respectively. Referring to FIG. 8, the tapered sides of the valve plate are also sealed against the gasket 334. Accordingly, a water-tight seal is formed around the entire aperture 214. The brush 332 extends around a perimeter of the aperture 214 as shown in FIG. 8 and retains the sand therein.

When the solenoid 326 retracts, the valve plate 320 opens. As the plate opens, binding caused by the sand 304 is minimized due to the clearance between the plate 320 and any surrounding structure (e.g., the plate 320 does not contact the aperture 214, brushes 332, or other surrounding structure with the exception of the gasket 334). This clearance is maintained throughout the valve plates's travel since the center of curvature of the top of the valve plate 320 is coaxial with the axle 324 (see FIG. 7). Accordingly, frictional binding is minimized. Furthermore, friction between the gasket 334 and the valve plate 320 is reduced by the wedge-shape of the plate 320 (i.e., as the plate opens, there is an immediate separation between the plate 320 and the gasket 334) and the immediate separation of the lip 318 and the edge 321 from the gasket 334. Advantageously, the frictional forces acting upon the plate are minimized.

The embodiments described above are intended to be illustrative only. Other embodiments of the present invention could be made which lack some or all of these low friction characteristics without departing from the scope of the invention.

When the plate closes, the sharp edge 321 permits the plate to move through the falling sand 304 with relative ease. Once the plate edge 321 engages the rear portion of the brush 332, the flow of sand 304 is stopped. Yet the brush 334, as previously explained, will permit the plate to move freely to its fully closed position. Furthermore, the wedge-like shape of the plate results in negligible gasket friction. That is, the plate 320 has little or no contact with the gasket 334 until the plate has reached its fully closed position.

Accordingly, the valve assembly 302 of the first embodiment provides an efficient, water-tight seal for the aperture 314 without inducing significant frictional forces to the valve plate 320.

System Controller

Figure 10A:
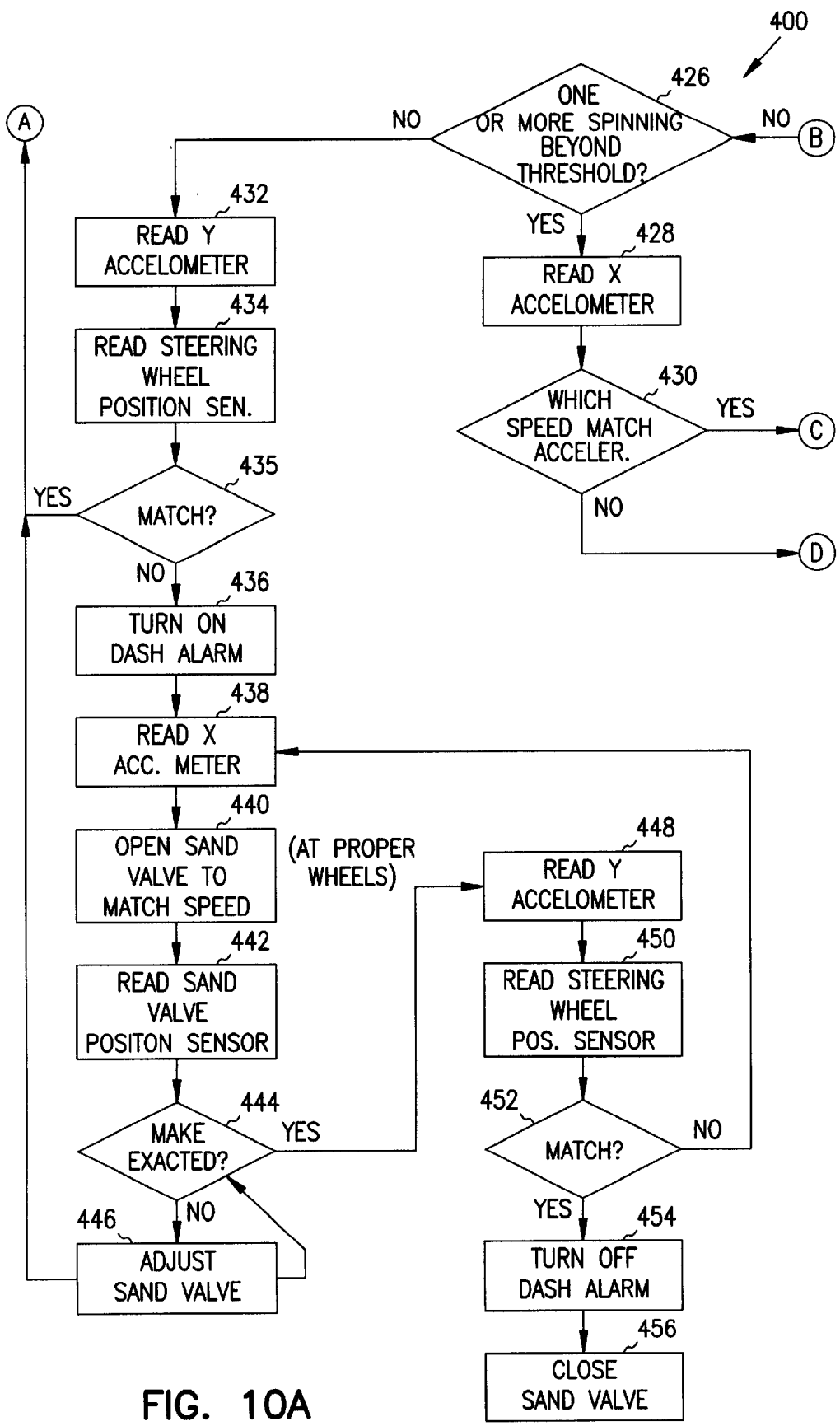
FIG. 10 is flowchart describing the events that occur during operation of a controller in accordance with one embodiment of the present invention.
Figure 10B:
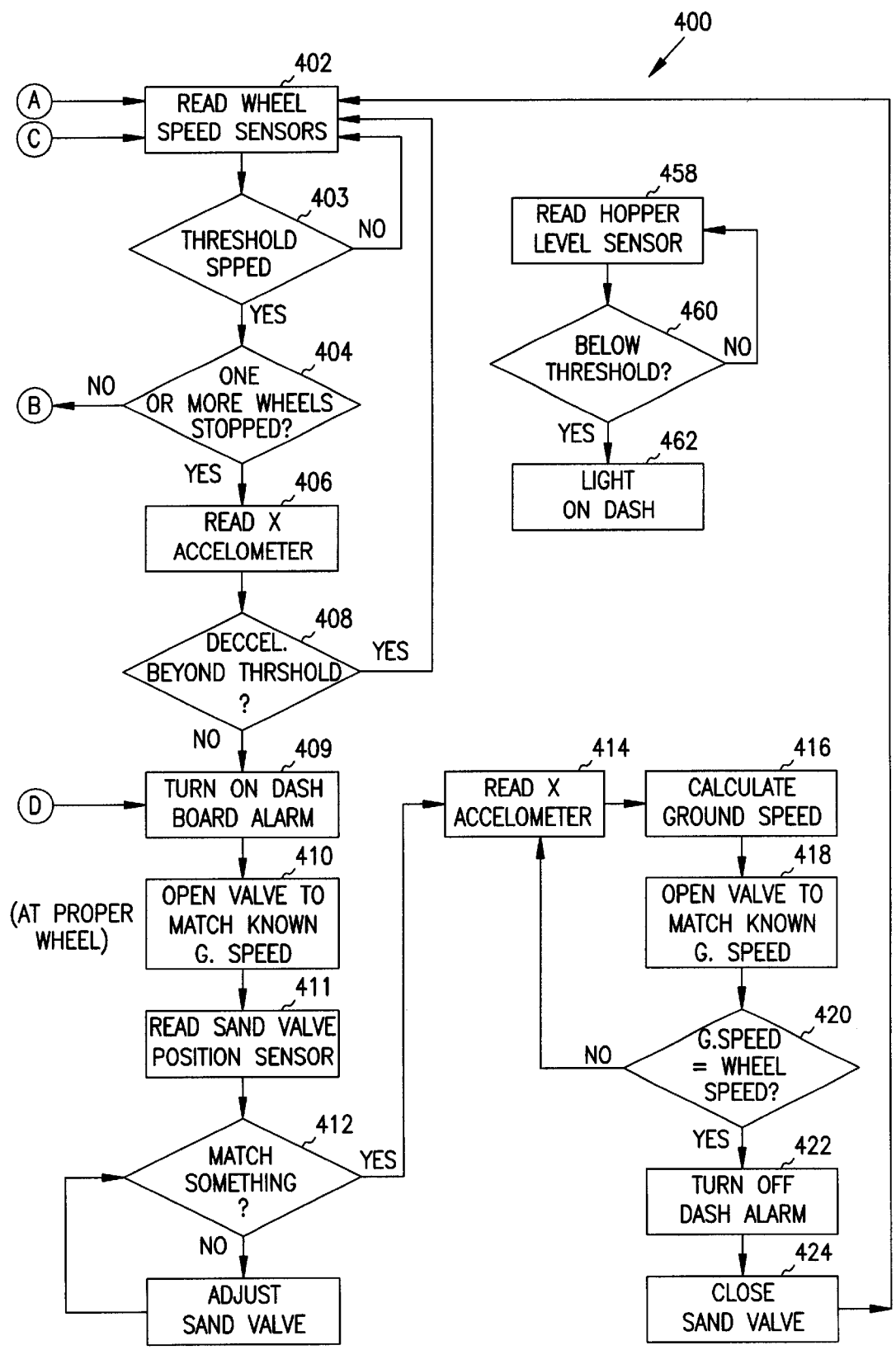
Figure 11:
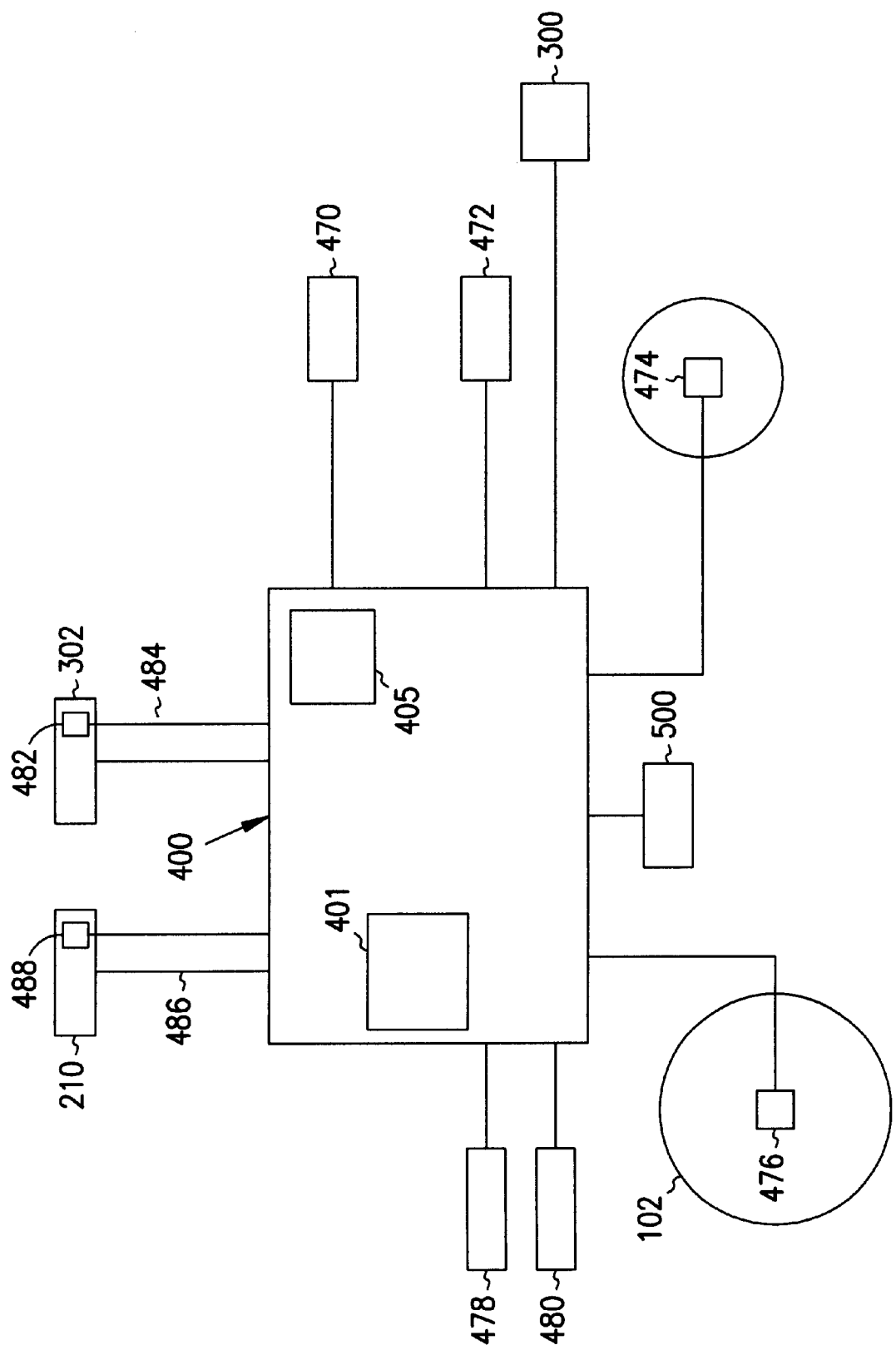
FIG. 11 is a diagrammatic view of the system controller of FIG. 10.

Referring now to FIGS. 10–11, the system controller 400 is shown in diagrammatic form. Referring first to FIG. 11, the controller has a microprocessor 401 that receives inputs or signals from several remote sensors, processes these signals and directs the opening and closing of the valve assembly 302 as will be described. The controller 400 may also have a memory device 405.

While described herein with reference to specific sensors, those of skill in the art will realize that other sensing units may also be included. For example, temperature sensors may be included to determine if freezing conditions exist. With reference to the exemplary embodiments described below, the actual sensors are known in the art and are not discussed in detail herein. However, reference is made to the sensor inputs and the controller responses or outputs thereto.

The vehicle 100 may include one or more steering wheel position sensors 474. These sensors inform the controller 400 of the driver's steering inputs. As explained below, steering wheel position is used in conjunction with other sensor readings to determine if the vehicle 100 is responsive to turning inputs.

One or more wheel speed sensors 476 may be used to determine the speed at which the tires/wheels are spinning. The wheel speed sensor may be incorporated into the anti-lock braking system of the vehicle.

X and Y accelerometers 478, 480 inform the controller 400 of vehicle dynamic response to various operator commands. The X accelerometer 478 measures acceleration along the fore-and-aft axis of the vehicle 100. The Y accelerometer 480 measures acceleration along an axis transverse to the vehicle. As those skilled in the art will realize, accelerometers can detect both positive and negative changes in acceleration. The X accelerometer signal may be used by the controller to calculate the actual vehicle or ground speed (true speed) by comparison of the signal over time. Other techniques may also be used to measure ground speed. For example, a radar unit may be incorporated onto the vehicle 100.

One or more position sensors 482 is also incorporated into the valve assembly 302 to inform the controller 400 of the actual valve opening. A first control output 484 controls the valve position. Optionally, the controller may include a second control output 486 to control the nozzle aiming mechanism 210. A nozzle position sensor 488 may be included to inform the controller 400 of the nozzle position. In one embodiment, the controller triggers a visual and/or audio warning 504 (see FIG. 12) on the indicator panel 500 that the valve assembly has opened. By receiving notification that the device 200 has activated, the driver is made aware of slippery road conditions that may have been otherwise unknown.

Referring specifically to FIG. 10, one or more of these signals are continually evaluated by the system controller 400. When design thresholds are crossed, the controller commands the normally closed valve assembly 302 open by energizing the solenoid 326 to move the valve plate 320. As previously described, the valve plate can be opened in varying amounts corresponding to the controller command. The plate remains at least partially open until the controller senses traction has been restored.

In operation, the controller constantly monitors the wheel speed sensors at 402 in FIG. 10. A predetermined threshold speed is programmed into the controller 400. As long as the ground speed remains below that threshold at 403, the traction device 200 will not activate. In one embodiment, the threshold speed is 5 mph.

If the vehicle is traveling in excess of the threshold speed, the controller 400 monitors the wheel speed sensors to determine if one or more wheels is stopped at 404. If a wheel is stopped, the controller reads the X accelerometer at 406 to determine if the vehicle is decelerating properly. If the controller determines the vehicle is decelerating at 408, it returns to 402. If the controller determines otherwise, the controller activates the driver warning 504 (see FIG. 12) at 409 and activates the valve assembly for the particular wheel at 410. The valve is opened in proportion to the last known ground speed (i.e., the wheel speed known right before the wheel stopped or the anti-lock brake system engaged). At this point, the position of the sand valve is read at 411 by the controller to determine if the last known ground speed corresponds to the valve position at 412. The valve plate 320 can be adjustably positioned between its opened and closed position and thus may be calibrated to maintain a certain opening at a certain speed. Once the controller determines that the last known ground speed and the valve position correspond, it reads the X accelerometer at 414 and calculates the actual ground speed from the accelerometer signal at 416. With the actual ground speed determined, the controller adjusts the valve assembly 302 to correspond to the calculated speed at 418. The controller will continue with this process of reading the X accelerometer, calculating the ground speed and adjusting the valve assembly until it determines that the ground speed matches the wheel speed at 420. A match indicates that traction has been regained and the controller halts the dashboard alarm signal 504 at 422, closes the sand valve at 424, and returns to 402.

The anti-lock brake system of the vehicle allows the gradual rotation of the wheels. This gradual rotation "pins" the traction enhancing material 304 under the tire, thus raising the coefficient of friction to reduce the vehicle stopping distance.

The opening of the valve assembly 302 can be proportional as described herein. Alternatively, the opening of the valve may be a fluttering event with a longer elapsed open time of the valve for higher ground speeds and less open time/more closed time as the vehicle slows. With response time being critical, an alternative design may utilize a solenoid to open the valve while the servo may be used to gradually close the valve as the vehicle slows.

The identical technique is applied to each wheel having a traction device 200 installed. The controller is capable of simultaneously monitoring wheel speeds and valve positions for a plurality of devices. Accordingly, the device 200 can function on one or more wheels simultaneously.

Another condition frequently encountered on slippery roadways is what is commonly referred to as a "spin out." Here, the drive wheels encounter slippery road conditions and begin to spin excessively. In this situation, the controller monitors wheel speed as it did at 402. However, when the controller queries whether the wheel is stopped at 404, the wheel speed sensor indicates the wheel is spinning. The controller then determines whether the wheel is spinning beyond a threshold level at 426. If the controller finds that the wheel is spinning beyond the threshold level, it reads the X accelerometer at 428 and compares the reading to the wheel speed at 430. If the values do not match, the controller activates the system and proceeds to 409 where it continues as described above. If the wheel speed is found to correspond to the X accelerometer reading, the system returns to 402.

Yet another condition addressed by the present invention involves a turning sequence without braking. That is, the vehicle driver turns to the right, for example, on a slippery road but the vehicle doesn't respond. Like the spin out described above, the controller queries whether the wheel(s) is spinning beyond the threshold value at 426. However, unlike a spin out, the controller finds that the wheel(s) is below threshold and proceeds to read the Y accelerometer at 432 and the steering wheel position sensors at 434. If the controller 400 determines that the Y accelerometer reading corresponds to the steering wheel position at 435, i.e., it senses that the vehicle is actually moving in the direction it is being turned, it returns to 402. However, if the two signals do not correspond, the controller activates the dashboard indicator 504 (see FIG. 12) at 436. The controller then proceeds to read the X accelerometer at 438, open the valve assembly 302 at 440, and read the valve assembly position at 442. The controller than compares the valve assembly position to the last known ground speed at 444. The valve assembly 302 is adjusted until it corresponds to the last known ground speed at 446. The controller then proceeds to read the Y accelerometer at 448 and the steering wheel position sensors at 450 and compare the two readings at 452.

If a match is not found, the controller returns to 438 and executes the loop again. If a match is determined, the controller turns the dashboard alarm off at 454, closes the valve assembly at 456, and returns to 402.

The controller may also monitor the volume of traction enhancing material 304 in the hopper 300. The level sensor is read at 458 and, if found to be below a predetermined threshold level at 460, the controller provides an indication 502 (see FIG. 12) to the driver via a visual or audible cue at 462. To accommodate larger vehicles or larger volumes of traction enhancing material, the system may incorporate a remote hopper (not shown). The remote hopper would monitor the level in the hopper 300 and deliver an amount of traction enhancing material when the level fell below the threshold level.

To ensure that the system is operating correctly, a self diagnostic may be performed each time power is provided (i.e., each time the vehicle is started). The diagnostic can, for example, verify that the controller is receiving the various control inputs and that the internal controller electronics are functioning properly. In the event of a detected fault, the diagnostic can inform the driver with an audible or visual warning.

Figure 13:
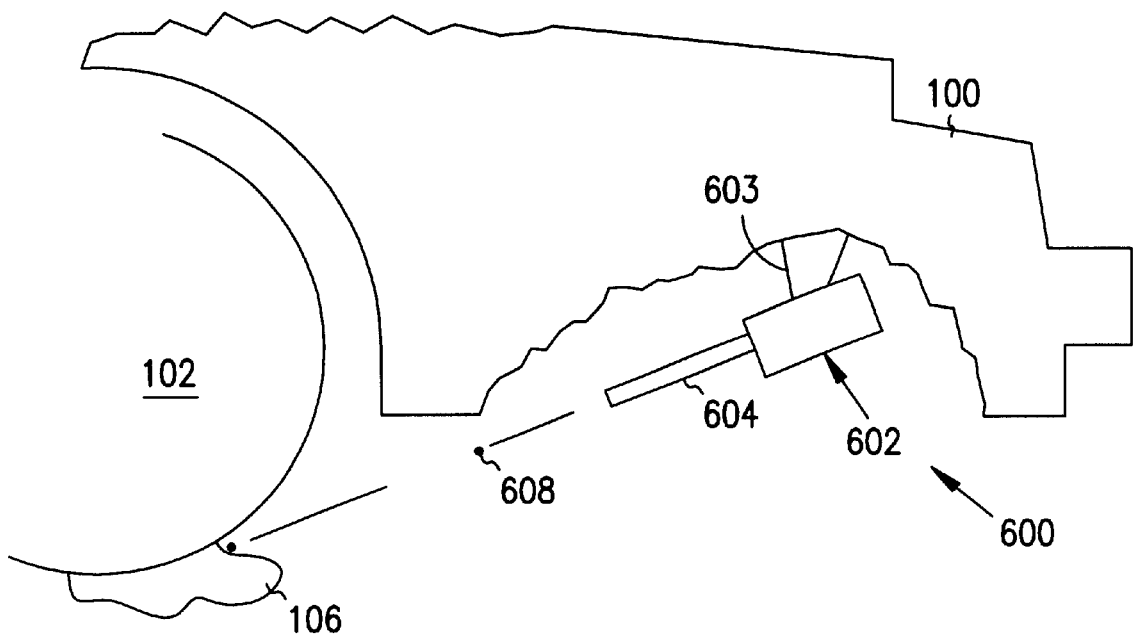
FIG. 13 is a diagrammatic view of another embodiment of the traction enhancing device in accordance with the present invention.

Other embodiments are also possible within the scope of the invention. For example, FIG. 13 shows an auxiliary apparatus 600 that may be employed to improve reaction times and also improve traction during hydroplaning (when tires "ride-over" a body of water). The apparatus 600 may be used either independently or in conjunction with the traction device 200. The auxiliary apparatus 600 utilizes a discharge unit 602 having a compressed gas source to accelerate a projectile 608. In the embodiment shown in FIG. 13, the discharge unit 602 is a modified version of the product "Shocker Sport S/F" manufactured by Smart Parts, Inc.

Still referring to FIG. 13, the discharge unit 602 is mounted within the wheel well by a series of brackets 603. The unit 602 is powered by compressed gas such as air, $CO_2$, or nitrogen. It is generally located in front of one or both front tires 102 of the automobile 100 and has a barrel 604 aimed a shallow angle toward the area 106. The discharge unit is modified to be controlled by the system controller 400. That is, the discharge unit 602 will discharge a pellet or projectile 608 on command from the controller 400. In may also include a modified barrel 604 to accommodate a larger projectile 608 as further described below.

Figure 14:
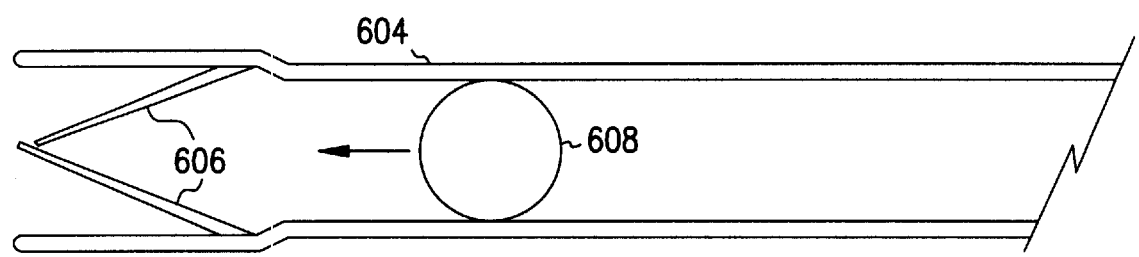
FIG. 14 is an enlarged sectional view of a portion of the device of FIG. 13.

The discharge unit 602 is preferably protected from contamination, especially water. To prevent entry of water into the barrel 604, the barrel may have a series of flexible tabs 606 as shown in FIG. 14. The tabs deflect to release the exiting projectile 608 but close to prevent entry of contaminants.

Figure 15:
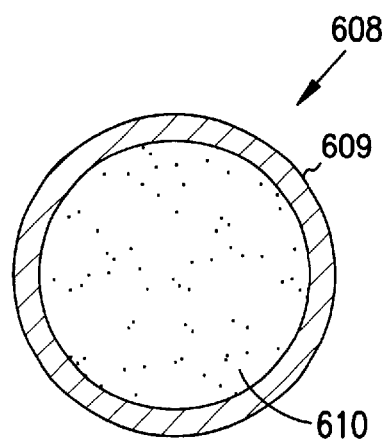
FIG. 15 is a projectile in accordance with one embodiment of the invention for use with the device of FIG. 13.

Referring to FIG. 15, the projectile 608 may comprise a spherical shell 609 having a granular substance 610 encased therein. The substance 610 may be sand, crushed rock, salt, crushed glass, or a combination thereof. In one embodiment, the shell 609 is formed from a soft gelatin material molded around the granular substance 610. After the granular substance 610 is encased within the gelatin shell 609, the shell is dried to produce a hard, brittle projectile that will fracture on impact with the ground. Upon fracture, the granular substance within is distributed to the road surface. The shell may be biodegradable as well, eliminating environmental waste concerns.

In addition to the shell-encased granular projectile 608, the projectile may also be a glass sphere that is modified to fracture on impact. This modification may be made by scoring, crystallizing or other processing (e.g., heating followed by rapid cooling), or modifications to the manufacturing method wherein fracture planes are produced within the projectile 608. While described as a sphere, projectiles of other shapes may also be used.

In operation, the discharge unit 600 of FIG. 13 would fire the projectile 608 in response to a loss of traction. Since the unit 600 relies upon an energy source (compressed gas) rather than gravitational forces, it is able to deliver the projectile to the area 106 very quickly. When used in conjunction with the device 200, the apparatus 600 would operate for approximately the first 0.5 seconds. At that point, the device 200 can assume the delivery of traction enhancing material 304 and the apparatus 600 may be deactivated.

The apparatus 600 may also be of benefit when the vehicle is hydroplaning. Because of the projectile speed, it can penetrate the water surface and reach the area 106. On impact (or under the force of the wheel), the sphere would fracture and thus distribute its traction enhancing substance.

Other modifications are also possible within the scope of the invention. For instance, in recent years, state transportation departments have investigated how better to determine what roadways need sanding or salting. To this end, the controller 400 may communicate with a cellular phone 470 and a global positioning system (GPS) 472 as shown in FIG. 11. Whenever the device 200 is activated, the controller 400 can notify a bay station of the location and time of activation using the GPS 472 and cellular phone 470. Other parameters (e.g., vehicle identification) could also be transmitted. After processing the information, the bay station may relay this information to mobile sand trucks. Thus, the transportation department is better able to identify and treat poor road conditions that would otherwise remain unknown.

Another benefit of the present invention is its ability to monitor the brake system. When the front wheel speed sensors determine that the front wheels are approaching lock-up, the controller can check the rear wheel speed sensors to determine if the same braking condition exists. If not, the controller can provide an indication to the driver that the fade between the front and rear brakes may need adjustment.

Yet another benefit of the present invention involves accident reconstruction. By providing the controller with sufficient memory 405 (see FIG. 11) to store the X and/or Y accelerometer signals for a period of time, the system may aid officials in accident investigation. In particular, by retrieving the accelerometer data from the controller, an investigator may be better able to determine the sequence of events leading up to an accident. The controller would only need to retain the information for a short duration at which time the stored information could be overwritten with new data. Other data including the steering wheel position signal could similarly be stored.

The traction device of the present invention can also be used with other vehicles besides automobiles. For example, emergency vehicles, utility vehicles and even railroad vehicles may incorporate the present design with minor modifications. In addition, it may be incorporated into aircraft landing gear. Furthermore, the control system 400 could be optimized for traction during acceleration as well as stopping.

Accordingly, the present invention provides an effective traction device that can be used on a variety of vehicles. By taking advantage of the vehicle anti-lock brake system, the present invention may provide improved traction with minimal dispersion of sand. Additionally, the present invention takes advantage of air incident on the vehicle rather than a separate power source to disperse the traction enhancing material. Furthermore, the system is fully automatic and requires no driver input in order to operate.

Preferred embodiments of the present invention are described above. Those skilled in the art will recognize that many embodiments are possible within the scope of the invention. Variations, modifications, and combinations of the various parts and assemblies can certainly be made and still fall within the scope of the invention. For example, an over-ride switch that allows the operator to activate the valve on demand may be provided. Thus, the invention is limited only by the appended claims, and equivalents thereto.

What is claimed is:

1. A device for distributing a traction enhancing material to a portion of road surface generally forward of one or more tires of a moving vehicle, the device comprising:

an air duct attached to the vehicle, wherein the air duct defines an interior passageway, the air duct having:
   a scoop for receiving air incident on the moving vehicle;
   a nozzle for directing the air to the portion of road surface; and
   one or more elbows intermediate the scoop and nozzle, the elbow providing a smooth transition for air traveling from the scoop to the nozzle;

a storage hopper adapted to store a volume of traction enhancing material wherein the hopper has an outlet channel;

a valve assembly for selectively opening and closing an aperture defined by an intersection of the outlet channel and the air duct, wherein the valve assembly permits movement of the traction enhancing material from the hopper into the air duct where it becomes entrained with the air; and a control system for selectively activating the valve assembly in response to one or more control inputs.

2. The device of claim 1 wherein the scoop is located slightly forward of a front end of the vehicle.

3. The device of claim 1 wherein the scoop has a wide end and a narrow end, wherein the scoop has a flared mouth having a mouth diameter associated with the wide end of the scoop.

4. The device of claim 3 wherein the air duct has a duct diameter less than the mouth diameter.

5. The device of claim 4 wherein the nozzle further comprises:

an enlarged, annular portion having a nozzle diameter larger than the duct diameter; and
   an internal tubular portion, the tubular portion having a one or more openings that permit the air to expand from the tubular portion into the annular portion but are insufficient in size to permit the passage of the traction enhancing material from the tubular portion into the annular portion.

6. The device of claim 5 wherein the openings on the tubular portion comprise a series of holes.

7. The device of claim 5 wherein the openings on the tubular portion comprise a series of slots.

8. The device of claim 1 wherein the nozzle further comprises a nozzle aiming mechanism.

9. The device of claim 1 wherein the hopper additionally comprises:

a removable cover;
   a heat trace proximate the outlet channel and the aperture to prevent freezing of the traction enhancing material; and
   a level sensor to determine the volume of traction enhancing material present within the hopper.

10. The device of claim 1 wherein the control system further comprises:

a microprocessor-based module for receiving and processing the control inputs; and
    a first control output for selectively opening and closing the valve assembly in response to the control inputs.

11. The device of claim 10 wherein the control system further comprises a second control output for selectively aiming the nozzle.

12. The device of claim 1 wherein the control inputs comprise:

one or more accelerometers operatively connected to the control system;
    one or more wheel speed sensors operatively connected to the control system; and
    one or more steering wheel position sensors operatively connected to the control system.

13. The device of claim 1, wherein the traction enhancing material comprises sand.

14. The device of claim 1 wherein the valve assembly comprises:

a valve plate disposed over the aperture, the valve plate movable between an open and a closed position;
    a displacing device for displacing the valve plate between the open and closed positions;
    a retaining member extending around a periphery of the aperture; and
    a gasket extending around the periphery of the aperture.

15. The device of claim 1 further comprising a source of compressed gas attached to the air duct.

16. A device for distributing a traction enhancing material to a portion of road surface generally forward of one or more tires of a moving vehicle, the device comprising:

an air duct for receiving air incident on the vehicle;
    a storage hopper adapted to hold a traction enhancing material;
    a valve assembly intermediate the hopper and the air duct wherein the valve assembly selectively permits communication between the hopper and the air duct; and
    a control system for selectively activating the valve assembly in response to one or more control inputs.

17. The device of claim 16 wherein the hopper couples to the air duct at an aperture.

18. The device of claim 17 wherein the valve assembly comprises a movable valve member selectively covering the aperture.

19. The device of claim 16 wherein the air duct further comprises:

an air scoop for receiving the air;
    a nozzle for directing the air and traction enhancing material to a tire/road interface; and
    an elbow intermediate the air scoop and the nozzle.

* * * * *